United States Patent [19]
Peterson

[11] Patent Number: 5,426,841
[45] Date of Patent: Jun. 27, 1995

[54] METHOD AND TOOL FOR REMOVING AND REPLACING A VEHICLE WHEEL

[76] Inventor: Richard O. Peterson, Box 321-A, Little Valley, N.Y. 14755

[21] Appl. No.: 178,796

[22] Filed: Jan. 7, 1994

[51] Int. Cl.[6] .................. B23P 19/04; B25B 27/14; B60B 29/00
[52] U.S. Cl. .................. 29/426.3; 29/273; 29/402.08; 29/802; 254/134; 414/428
[58] Field of Search ............. 29/245, 273, 802, 894.3, 29/426.3, 402.08, 281.4; 254/134, DIG. 10; 414/426–429, 466

[56] References Cited
U.S. PATENT DOCUMENTS

| | | | |
|---|---|---|---|
| 3,321,169 | 5/1967 | Fowler | 29/273 X |
| 3,830,387 | 8/1974 | Virnig | 29/273 X |
| 3,847,294 | 11/1974 | Davenport | 414/428 |
| 4,607,823 | 8/1986 | Thomas | 254/134 |
| 4,709,474 | 12/1987 | Eckert | 29/802 |

OTHER PUBLICATIONS
Peterson "Slick Willy" Sales Brochure Tool for replacing Dayton hubs. Date unknown.

*Primary Examiner*—Peter Vo
*Attorney, Agent, or Firm*—Lovercheck and Lovercheck

[57] ABSTRACT

A tool for removing and replacing wheels of heavy vehicles such as buses and trucks. The tool has a track with a first end member to be clamped to the vehicle axle. Chains on the intermediate part of the tool support the tool on the wheel of the vehicle. The chains can be released when the first end is clamped and the second end supported. Adjustable legs are supported on the second end of the track for supporting the second end of the track. A carriage with a wheel support on it is movable on the track. The wheel support is clamped firmly to the wheel support on the carriage. The axle nut may then be removed and the carriage can be moved toward the second end member and locked in position on the track with the wheel on it. The wheel can then be swung to an inclined position for servicing. When serviced, the carriage with the wheel can be moved toward the first end member of the track bringing the wheel back onto the axle.

15 Claims, 3 Drawing Sheets

METHOD AND TOOL FOR REMOVING AND REPLACING A VEHICLE WHEEL

BACKGROUND OF THE INVENTION

This invention relates to maintenance and service of wheels, brake drums, bearings and the like on automotive trucks, buses and other large vehicles and more particularly to an apparatus and method for removing and replacing vehicle wheels onto such vehicles.

The method and apparatus disclosed permits a wheel to be drawn off an axle and away from an axle assembly and controls the wheel so that it is aligned with the axle for replacement of the wheel on the axle assembly with minimal effort.

Vehicle brake drums must be occasionally removed from the axle of a vehicle to inspect and service the condition of the brake drum, brake shoes, seals and bearings. It is very important that the drum be permitted to tilt to a convenient position for inspection and service and then swung back into alignment with the axle. It is also important for the wheel to be held in alignment with the axle while it is being replaced.

Several long existing problems are associated with the removal and reinstallation of wheels on the axles of trucks, vans and other types of vehicles. Truck wheels are relatively heavy, often weighing over one hundred pounds. The rear portion of the cylindrical body of a convention brake drum is largely hollowed out to form a cylindrical cavity which slides over the brake shoes carried on the spindle of a wheel axle assembly. As a consequence, the greater proportion of the weight of a truck brake drum is located forwardly toward the hub and lug bolts of the brake drum. This weight unbalance and the substantial weight of the drum makes it very difficult for a mechanic to pull the wheel drum off of a truck spindle without permitting the drum to tilt upwardly or downwardly and damage bearings or bearing seals in the drum. Brake drum bearing seals are generally always replaced when a truck brake drum is removed from a spindle. Applicant's tool holds the wheel in alignment with the axle for replacement. U.S. Pat. No. 4,607,823, for example, provides a wheel jack to carry the removed wheel. The jack and wheel may be carried on a rough or uneven surface and the wheel will not be in alignment with the axle after removal and will be difficult to replace.

The invention relates to brake drum tools that permit a brake drum to be removed from the spindle of an axle assembly without damaging bearings or bearing seals carried inside the brake drum. The tool maintains alignment of the wheel and spindle for replacement. In still another respect, the invention relates to a brake wheel maintenance apparatus. The apparatus materially reduces the time required to remove a wheel and a brake drum from the spindle of a wheel axle assembly to replace bearings and seals in the drum, and, required to reinstall the brake drum on the spindle.

SUMMARY OF THE INVENTION

It is an object of the invention to provide a tool for removing wheels that holds the wheel in alignment with the axle.

It is another object of the invention is to provide a method and apparatus that will prevent accidents to mechanics and laborers during servicing of wheels on heavy vehicles.

It is another object of the invention to provide a tool that will enable a mechanic to do a better and more efficient job of vehicle maintenance.

It is another object of the invention to provide a tool for handling, removing and replacing wheels from heavy vehicles that is simple in construction, economical to manufacture and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

BRIEF DESCRIPTION OF THE DRAWING(S)

DESCRIPTION OF THE PREFERRED EMBODIMENT(S)

Figure 1:
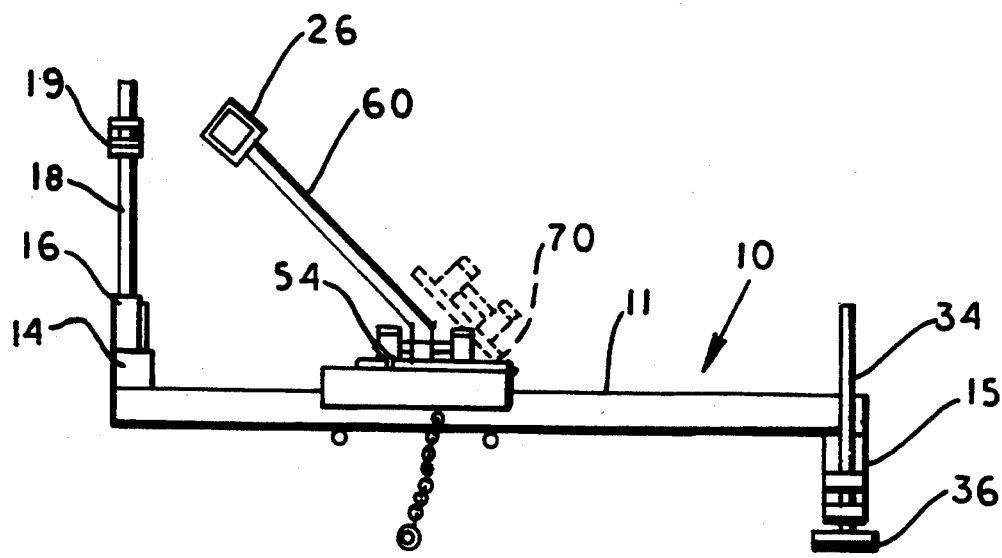
FIG. 1 is a side view of the tool for removing and replacing wheels on heavy vehicles.
Figure 2:
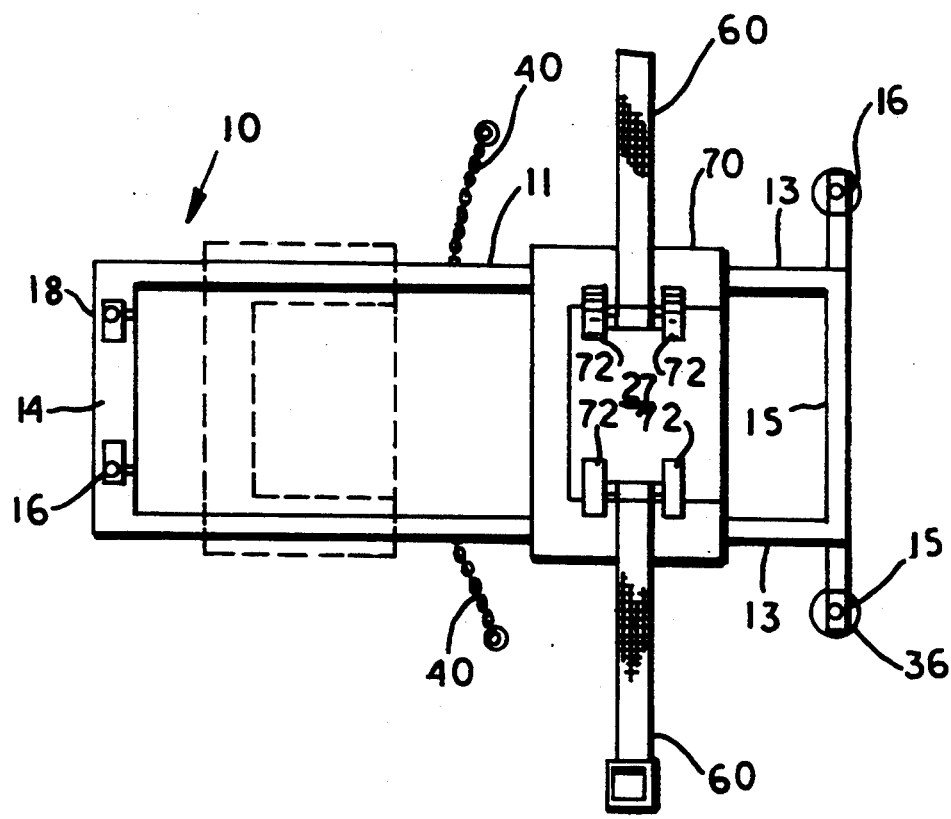
FIG. 2 is a top view of the tool.
Figure 3:
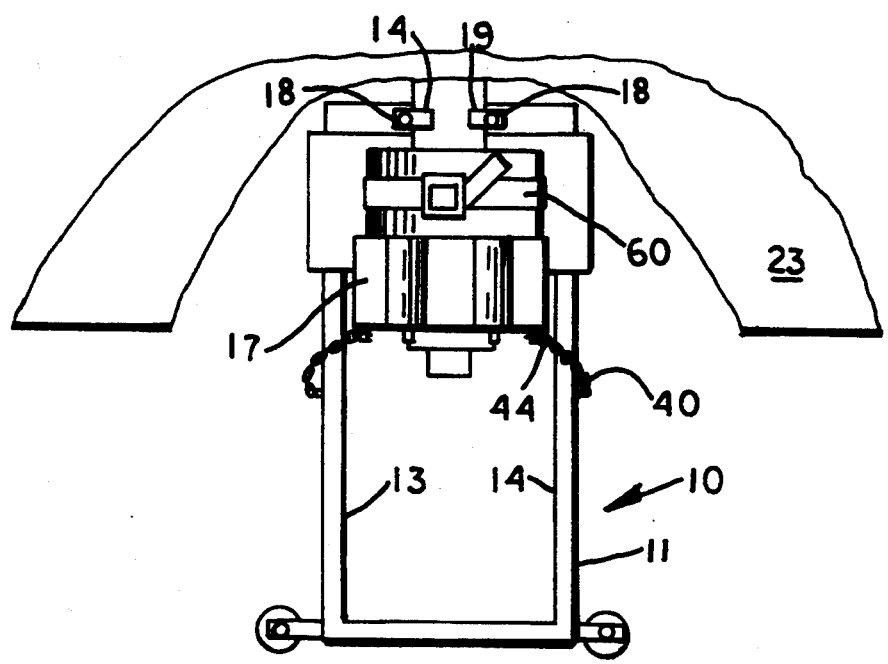
FIG. 3 is a top view of the tool supported on a vehicle.
Figure 4:
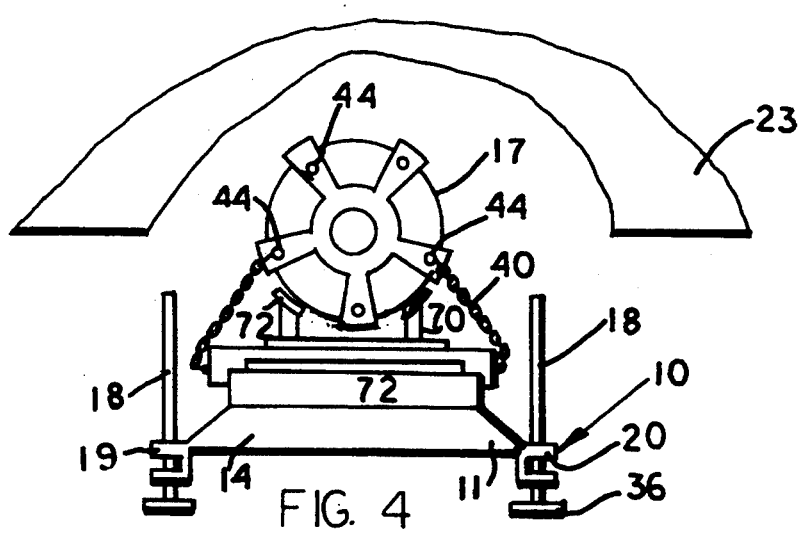
FIG. 4 is a front view of the tool supported on a wheel on a vehicle axle.
Figure 5:
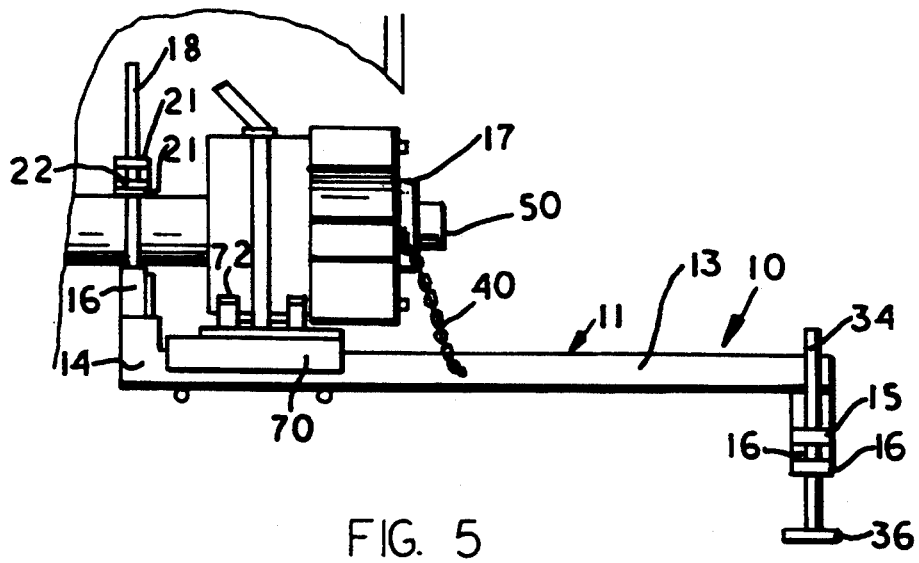
FIG. 5 is a side view of the tool supported on a vehicle axle and on the vehicle wheels.
Figure 6:
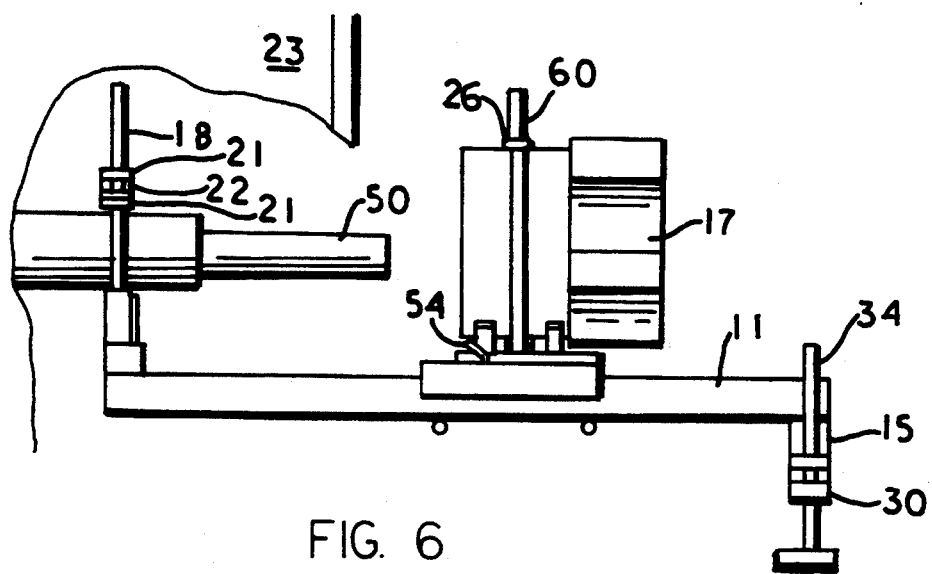
FIG. 6 is a side view of the tool supported on a vehicle with the removed wheel supported on the wheel remover tool.

Now with more particular reference to the drawings, tool is provided for replacing wheel 17 on vehicle 23 such as an automobile, truck and/or bus.

Tool 10 is made up of frame 11, carriage 12 and wheel support 70 having top 27. Frame 11 is made up of spaced track members 13 having first end member 14 and second end member 15 fixed to the ends thereof. Track members 13 have chains 40 fixed to the intermediate parts thereof. Carriage 12 has top 31 and bottom 33.

First end member 14 has spaced tubular socket members 16 removably receiving tubular posts 18. Tubular posts 18 have upper plate-like clamps 19 slidably supported on their upper ends. Upper plate-like clamps 19 are of the type similar to pipe clamps commonly used in plumbing and carpenter shops. Upper plate-like clamps 19 may each have spaced fixed members 21 and movable member 22 each having a hole, familiar to those skilled in the art, receiving tubular posts 18. Movable member 22 is received between spaced fixed members 21.

Second end member 15 has adjustable plate-like clamps 30, like upper plate-like clamps 19, fixed to its outer ends. Adjustable plate-like clamps 30 slidably receive tubular legs 34. Tubular legs 34 have ground engaging feet 36 supported on the lower end.

Chains 40 may be attached to lug bolts 44 of wheel 17 to support carriage 12 on wheel 17 until clamp straps 60 are attached. Tubular legs 34 will then be adjusted to support second end member 15 of track members 13.

Lock 54 is provided on carriage 12 to lock carriage in position on track members 13.

Wheel support 70 is hinged to carriage 12 at pivot 32. Wheel support 70 at pivot 32 has a cradle made up of spaced arcuate brake drum engaging members 72.

In operation, vehicle 23 will be raised to lift wheel from the ground. One tubular post 18 will be removed from socket members 16 and wheel support 70 will be pushed under wheel 17. Chains 40 will be attached to lug bolts 44 to support spaced track members 13. Tubular post 18 will be inserted in spaced tubular socket members 16 with pin 27 and slot 24 then rotated to lock tubular posts 18 in place.

Tubular legs 34 will then be adjusted in adjustable plate-like clamps 30 to support second end member 15 on ground engaging feet 36. Clamp straps 60 will be tightened by means of clamps 26 around brake drum 52 resting on wheel support 70. Clamps 26 may be a type of strap tightening device commonly used in binding loads in freight trucks and familiar to those skilled in the art. Clamps 26 act as a tensioning means for clamp straps 60. Tubular post 18 will be in spaced tubular socket members 16. Upper plate-like clamps 19 will then be adjusted on tubular post 18 to clamp tool 10 to axle 50. Tubular legs 34 can then be readjusted so that brake drum 52 is positively supported on carriage 12.

Figure 7:
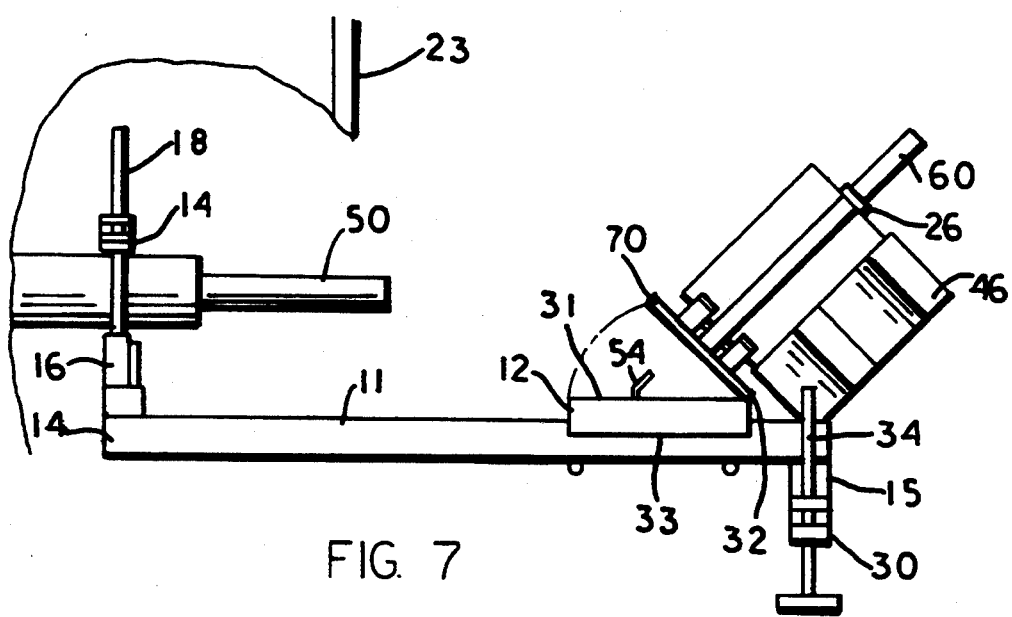
FIG. 7 is a side view the tool with the wheel removed from the axle swung to a convenient position for servicing.
Figure 8:
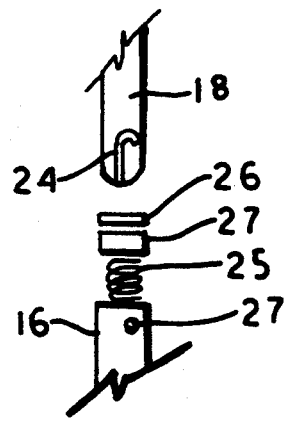
FIG. 8 is a partial exploded enlarged view of the parts used with the tool.

Wheel 17 can then be slid off axle 50. Carriage 12 can then be slid on spaced track member 13 toward second end member 15 carrying wheel 17. Wheel 17 can then be swung with wheel support 70, to the position as shown in FIG. 7, about pivot 32, to provide a convenient position of wheel 17 for work on the bearings and other parts of wheel 17.

When wheel 17 is properly serviced, wheel 17 can be swung back to its vertical position on wheel support 70, since space track member 13 has been held firmly to axle 50 by flexible members or clamp straps 60, clamps 26 and tubular posts 18. Carriage 12 can be slid back toward first end member 14 and wheel 17 will remain clamped by clamps 26 and a flexible elongated member, such as clamp straps 60 and perfectly aligned with axle 50. The axle nut can then be replaced and the vehicle will be ready for use.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A tool for removing and replacing a wheel on a vehicle having said wheel on an axle;
    said tool comprising a track having track members each having a first end and a second end, a first end member connected to said first ends and a second end member connected to said second ends of said track members;
    a carriage movably supported on and along said track and disposed above said track;
    a wheel support positioned on said carriage;
    said wheel support having a top and a bottom;
    a first clamping means disposed on said first end member and a second clamping means disposed on said wheel support;
    said first clamping means clamping said first end member to said axle from a position below said axle;
    a third clamping means clamping said wheel to said top of said wheel support; and,
    said carriage having means to move on said track toward said second end member with said wheel clamped to said wheel support.

2. The tool recited in claim 1 wherein said wheel support is swingably attached to said carriage to swing said wheel from a horizontal to an inclined position.

3. The tool recited in claim 2 wherein said wheel support has a brake drum engaging means supporting said wheel; and,
    a lock holds said carriage in position on said track.

4. The tool recited in claim 3 wherein said third clamping means is a flexible elongated member that is fixed to said carriage.

5. The tool recited in claim 1 wherein support means attached to said second end member for supporting said second end of each of said track members.

6. The tool recited in claim 5 wherein said first clamping means comprises clamping members slidably supported on downwardly extending tubular posts fixed to said track.

7. The tool recited in claim 5 wherein said support means comprises tubular legs attached to said second end member by means of adjustable clamps on said tubular legs for adjusting the height of said second end member.

8. The tool recited in claim 7 wherein said adjustable clamps having spaced tubular socket members that are attached to said second end members.

9. The tool recited in claim 8 wherein said tubular legs are removably supported on said first end member.

10. The tool recited in claim 1 wherein said second clamping member surrounds and engages a brake drum.

11. A method of removing and replacing a wheel from a vehicle having said wheel supported on an axle;
    providing a frame having track members each having a first end and a second end;
    said track members having a first end member, a second end member, said first end member connected to aid first ends and said second end member connected to said second ends of said track members and a carriage movably supported on and along said track members;
    said carriage having a top and a bottom;.
    clamping said first end member of said frame to said axle below said wheel;
    positioning said carriage beneath said axle and adjacent to said first end member of said track members;
    clamping said wheel to said top of said carriage;
    supporting said second end member on said carriage;
    removing said wheel from said axle by moving said carriage with said wheel toward said second end member of said track members; and,
    placing a replacement wheel on said axle by moving said carriage on said track members with said wheel thereon toward said first end member of said track members and attaching said replacement wheel to said axle.

12. The method of claim 11 further comprising support means on said track members for supporting an intermediate part of said track members on said wheel prior to clamping said first end member of said track members to said wheel.

13. The method of claim 12 wherein said support means comprises chains; and, supporting said chains on said wheel before clamping said first end member to said axle.

14. A method of removing and replacing a wheel on a vehicle having an axle with said wheel on said axle;

providing a track frame having a first end member, a second end member, and an intermediate part;

movably supporting a carriage on and along said track frame to move between said first end member to said second end member;

said carriage having a top;

supporting said second end member on a support surface by support means on said frame;

clamping said first end member to an axle with a wheel resting on said top of said carriage and removing said wheel from said axle;

supporting said intermediate part of said frame on said wheel with said wheel resting on said carriage;

moving said carriage supporting said wheel toward said second end member and removing said wheel from said carriage; and, placing a replacement wheel on said carriage and moving said carriage toward said first end member thereby positioning said replacement wheel onto said axle.

15. The method of claim 14 wherein said carriage has a wheel support thereon;

swinging said wheel with said wheel support to an inclined position after said wheel has been removed from said vehicle.

* * * * *